US010407602B2

(12) United States Patent
Kujak et al.

(10) Patent No.: US 10,407,602 B2
(45) Date of Patent: Sep. 10, 2019

(54) LOW GLOBAL WARMING POTENTIAL REFRIGERANTS IN LIQUID CHILLERS

(71) Applicant: TRANE INTERNATIONAL INC., Davidson, NC (US)

(72) Inventors: Stephen A. Kujak, Brownsville, MN (US); Kenneth J. Schultz, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 15/827,902

(22) Filed: Nov. 30, 2017

(65) Prior Publication Data

US 2019/0161659 A1 May 30, 2019

(51) Int. Cl.
*C09K 5/04* (2006.01)

(52) U.S. Cl.
CPC ........ *C09K 5/044* (2013.01); *C09K 2205/122* (2013.01); *C09K 2205/40* (2013.01); *C09K 2205/41* (2013.01); *C09K 2205/44* (2013.01)

(58) Field of Classification Search
CPC ............... C09K 5/044; C09K 2205/41; C09K 2205/44; C09K 2205/40; C09K 2205/122
USPC .............................. 252/67; 62/467, 498, 529
See application file for complete search history.

(56) References Cited

U.S. PATENT DOCUMENTS

| | | | |
|---|---|---|---|
| 9,222,705 B2 | 12/2015 | Van Horn et al. | |
| 9,944,839 B2 * | 4/2018 | Schultz | C09K 5/045 |
| 2010/0078585 A1 * | 4/2010 | Robin | A62D 1/0057 |
| | | | 252/2 |
| 2011/0144216 A1 * | 6/2011 | Hulse | A01N 29/02 |
| | | | 514/757 |
| 2011/0147638 A1 * | 6/2011 | Robin | A62D 1/0057 |
| | | | 252/2 |
| 2012/0167599 A1 * | 7/2012 | Kontomaris | C09K 5/045 |
| | | | 62/77 |
| 2013/0119292 A1 * | 5/2013 | Robin | A62D 1/0057 |
| | | | 252/2 |
| 2013/0283832 A1 | 10/2013 | Kujak | |
| 2014/0174084 A1 * | 6/2014 | Kontomaris | F01K 25/10 |
| | | | 60/651 |
| 2015/0353800 A1 * | 12/2015 | Kujak | C09K 5/042 |
| | | | 62/77 |
| 2016/0312095 A1 * | 10/2016 | Schultz | C09K 5/045 |
| 2017/0328618 A1 | 11/2017 | Majurin et al. | |
| 2018/0112113 A1 * | 4/2018 | Schultz | C09K 5/045 |
| 2018/0264303 A1 * | 9/2018 | Robin | A62D 1/0092 |

OTHER PUBLICATIONS

CAS No. 156-60-5, Nov. 16, 1984. (Year: 1984).*
CAS No. 692-49-9, Nov. 16, 1984. (Year: 1984).*
Extended European Search Report, European Patent Application No. 18208114.1, Apr. 18 2019 (10 pages).
Anonymous, "Chemours proposes R123 drop-in"—Cooling Post, Mar. 30, 2016, available online at https://www.coolingpost.com/world-news/chemours-proposes-r123-drop-in/ (4 pages).
Anonymous, "Trane adopts new low GWP refrigerant R514A—Cooling Post", Jun. 15, 2016, available online at https://www.coolingpost.com/world-news/trane-adopts-new-low-gwp-refrigerant-r514a/.
Chemours, "Opteon (TM) XP30 (R-514A)", Jan. 1, 2016, available online at https://www.chemours.com/Refrigerants/en_US/products/Opteon/Stationary_Refrigeration/assets/downloads/opteon-xp30-product-information.pdf (1 page).

* cited by examiner

*Primary Examiner* — Douglas J McGinty
(74) *Attorney, Agent, or Firm* — Hamre, Schumann, Mueller & Larson, P.C.

(57) ABSTRACT

A refrigeration system is disclosed. The system includes a compressor, a condenser, an expansion device, and an evaporator fluidly connected to form a refrigeration circuit. A refrigerant composition including an environmentally-suitable chiller refrigerant that has a 100 year direct global warming potential (GWP) of less than 150 is included. The refrigerant composition includes a mixture including R-1336mzz-(Z) and R-1130-(E), wherein an amount of R-1336mzz-(Z) in the mixture is in a range from at or about 69% by weight to at or about 81% by weight, and an amount of R-1130-(E) in the mixture is in a range from at or about 31% by weight to at or about 19% by weight.

17 Claims, 2 Drawing Sheets

LOW GLOBAL WARMING POTENTIAL REFRIGERANTS IN LIQUID CHILLERS

FIELD

This disclosure relates generally to refrigeration systems. More specifically, this disclosure relates to refrigeration systems, for example, refrigeration, air conditioning, and/or heat pump systems that can be incorporated into a heating, ventilation, air conditioning, and refrigeration (HVACR) system or unit.

BACKGROUND

A refrigeration system, such as a centrifugal chiller, may utilize a low pressure refrigerant such as R-11, R-113, R-123, and multi-pressure refrigerants such as R-114 and R-245fa to operate at, for example, less than atmospheric pressure either at all times or under a set of operating or stand-down conditions.

SUMMARY

Methods of using refrigerant compositions and/or methods of retrofitting a chiller system with a refrigerant composition are described.

Environmental impacts of chiller refrigerants are a growing concern. For example, since 2011, the European Union has been phasing out refrigerants with a global warming potential (GWP) of more than, for example, 150 in some refrigeration systems. Environmentally-suitable chiller refrigerants, with suitable properties such as density, vapor pressure, heat of vaporization, and suitable chemical properties, which satisfy the requirements regarding safety and environment impacts, such as the European Union Standard discussed above, can be utilized for chiller systems. The environmentally-suitable chiller refrigerants are nonflammable or mildly flammable, non-ozone depleting, energy efficient, low in toxicity, compatible with materials of construction, and are chemically stable over the life of the equipment.

In an embodiment, refrigerant compositions disclosed are utilized in a negative pressure liquid chiller.

In an embodiment, the refrigerant compositions disclosed can be utilized as a replacement for R-123, R-11, or the like.

In an embodiment, the refrigerant composition is a blend of R-1336mzz-(Z) and R-1130-(E). In an embodiment, the refrigerant composition is environmentally friendly, safe, and energy-efficient.

In an embodiment, a method of charging a chiller system is disclosed. The method includes removing an existing refrigerant from the chiller system. The existing chiller refrigerant includes a relatively high global warming potential (GWP) or ozone depleting refrigerant and a lubricant. The method includes replacing all, or some part of, the high GWP refrigerant with a halogenated olefin composition. In an embodiment, the halogenated olefin composition includes a blend of R-1336mzz-(Z) and R-1130-(E) or similar isomers. A substantial portion of the chiller components (e.g., the system hardware) are retained and/or unchanged in the chiller system. In an embodiment, the existing chiller refrigerant includes R-123, R-11, or the like.

In an embodiment, a ratio of R-1336mzz-(Z) can be from at or about 69% by weight to at or about 81% by weight. In an embodiment, a ratio of R-1130-(E) can be from at or about 19% by weight to at or about 31% by weight. For example, in an embodiment, the refrigerant composition is a blend of R-1336mzz-(Z) and R-1130-(E) that is in a ratio of at or about 81% by weight R-1336mzz-(Z) to at or about 19% by weight R-1130-(E). In an embodiment, the refrigerant composition is a blend of R-1336mzz-(Z) and R-1130-(E) that is in a ratio of at or about 69% by weight R-1336mzz-(Z) to at or about 31% by weight R-1130-(E).

In an embodiment, a ratio of R-1336mzz-(Z) can be from at or about 74% by weight to at or about 81% by weight. In an embodiment, a ratio of R-1130-(E) can be from at or about 19% by weight to at or about 26% by weight. For example, in an embodiment, the refrigerant composition is a blend of R-1336mzz-(Z) and R-1130-(E) that is in a ratio of at or about 81% by weight R-1336mzz-(Z) to at or about 19% by weight R-1130-(E). In an embodiment, the refrigerant composition is a blend of R-1336mzz-(Z) and R-1130-(E) that is in a ratio of at or about 74% by weight R-1336mzz-(Z) to at or about 26% by weight R-1130-(E).

In an embodiment, the refrigerant composition is a blend of R-1336mzz-(Z) and R-1130-(E) that is in a ratio of at or about 75% by weight R-1336mzz-(Z) to at or about 25% by weight R-1130-(E). In such an embodiment, the refrigerant composition may have a similar vapor pressure to R-123 and/or R-11. In an embodiment, limited or no hardware changes may be completed when retrofitting a chiller system operating with R-123 or R-11 refrigerants.

In an embodiment, replacing the existing refrigerant with the refrigerant composition described herein may lead to adjusting an impeller diameter or speed change through either gear changes or addition of or adjustment to a variable frequency drive and/or electric motor sizing; adjusting for a modified evaporator or condenser tube having more optimal tube enhancements; switching to a compatible lubricant include, but not limited to, polyester, polyolester, polyvinylether, alkyl benzene, or the like; replacing sealing materials (e.g., elastomers, liquid adhesives, etc.); adjusting orifice sizing to optimize refrigerant flow rate and sealing between the evaporator and the condenser; adjusting a size of the economizer to allow for changes in refrigerant charge storage and operation; replacing or altering the purge to operate with the refrigerant composition; and/or adjusting, altering, or replacing controls to operate with the new refrigerant.

In an embodiment, a refrigeration system includes a compressor, a condenser, an expansion device, and an evaporator. The compressor, the condenser, the expansion device, and the evaporator are fluidly connected to form a refrigeration circuit. The chiller refrigerant includes an environmentally-suitable chiller refrigerant that has a 100 year direct global warming potential (GWP) of less than 150. In an embodiment, the chiller refrigerant has a GWP of less than 10. In an embodiment, the chiller refrigerant has a GWP of less than 5. In an embodiment, the chiller refrigerant has a GWP of at or about 2.

In an embodiment, a method of conducting a refrigeration cycle includes directing an environmentally-suitable chiller refrigerant to a compressor, directing the environmentally-suitable chiller refrigerant from the compressor to a condenser, directing the environmentally-suitable chiller refrigerant from the condenser to an expansion device, directing the environmentally-suitable chiller refrigerant from the expansion device to an evaporator, and directing the environmentally-suitable chiller refrigerant from the evaporator back to the compressor. The compressor, the condenser, the expansion device, and the evaporator are fluidly connected to form a refrigeration circuit to conduct the refrigeration cycle. The environmentally-suitable chiller refrigerant has a 100 year direct global warming potential (GWP) of less than 150. In an embodiment, the chiller refrigerant has a GWP of less than 10. In an embodiment, the chiller refrigerant has a GWP of less than 5. In an embodiment, the chiller refrigerant has a GWP of at or about 2.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates generally to refrigeration systems. More specifically, this disclosure relates to refrigeration systems, for example, refrigeration, air conditioning, and/or heat pump systems that can be incorporated into a heating, ventilation, air conditioning, and refrigeration (HVACR) system or unit.

In existing HVACR units, such as a chiller unit, it may be difficult to replace an existing refrigerant in the chiller unit with a more environmentally friendly refrigerant composition without replacing the chiller unit as well. Accordingly, it would be advantageous to have an environmentally suitable refrigerant composition that can be added to a chiller unit in the field. In an embodiment, replacing an existing refrigerant with an environmentally suitable refrigerant composition in the field can be relatively cheaper than replacing the chiller unit entirely.

In an embodiment, an existing refrigerant for a chiller unit can include, but is not limited to, R-123, R-11, and the like.

A negative pressure liquid chiller includes, for example, a liquid chiller that utilizes a refrigerant that operates at or below an environmental pressure.

A refrigerant is considered environmentally suitable when it has a 100 year direct global warming potential (GWP) of less than 150 times that of carbon dioxide. GWP is a relative measure of how much heat a greenhouse gas traps in the atmosphere as compared to carbon dioxide as a reference. A GWP is calculated over a specific time interval, commonly 20, 100 or 500 years. GWP is expressed as a factor of carbon dioxide (whose GWP is standardized to 1). The higher GWP potential for a refrigerant results in greater potential to contribute to global climate change.

Figure 1:
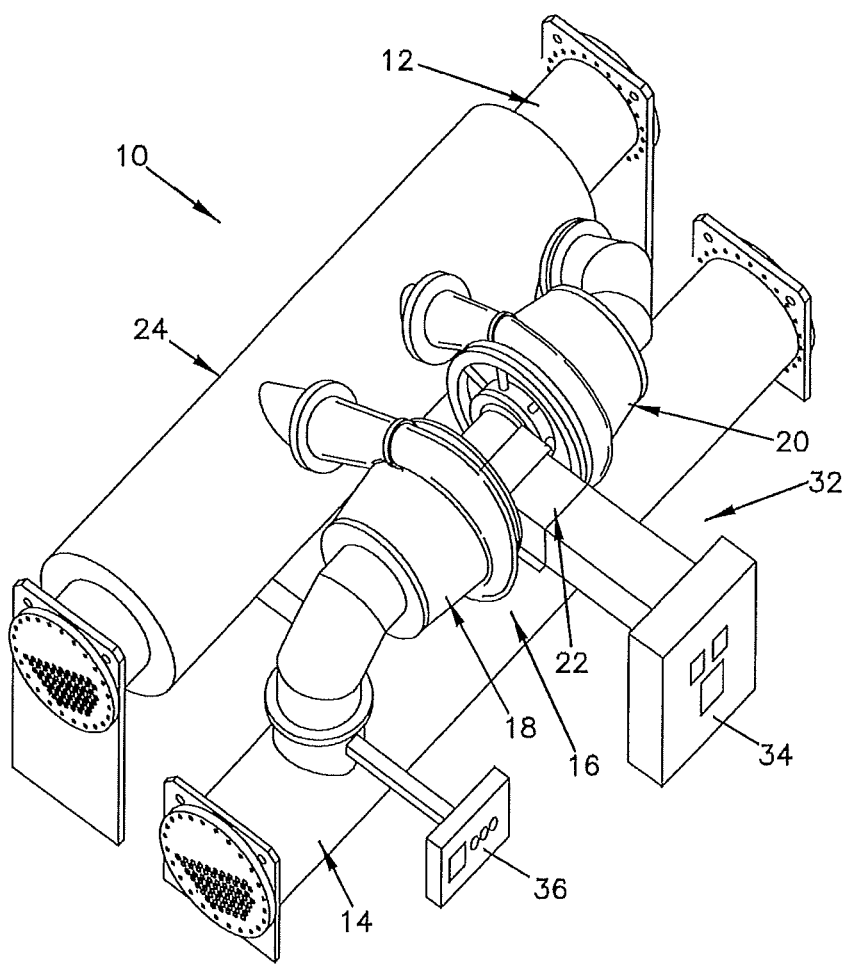
FIG. 1 is a perspective view of an HVACR system for implementing systems and methods described in this specification, according to an embodiment.

FIG. 1 is a perspective view of a HVACR system 10 which can be implemented as a chiller or include a chiller for implementing systems and methods described in this specification, according to an embodiment. The HVACR system 10 may include one or more additional features which are not illustrated for simplicity of the drawings.

The illustrated HVACR system 10 includes a condenser 12, an evaporator 14, a multi-stage compressor 16 having a first stage compressor 18 and a second stage compressor 20 that can be driven by any suitable electric motor 22. It will be appreciated that the compressor 16 can be a single stage compressor, according to an embodiment. The HVACR system 10 can also include an economizer 24, which may be coaxial with the condenser 12. It will be appreciated that the HVACR system 10 can include one or more additional features such as, but not limited to, one or more flow control devices, a lubricant separator, a heat sink, a pump, or the like.

A variable speed drive (VSD) system 32 includes electric motor 22. The compressor 16 can be driven by electric motor 22. The electric motor 22 may be located, for example, between the first stage compressor 18, the second stage compressor 20, and a VSD 34 including power electronics. The VSD 34 may alternatively be referred to as the variable frequency drive (VFD) 34. The electric motor 22 can include a direct drive, variable speed, hermetic motor, according to an embodiment. A speed of the electric motor 22 can be controlled by varying a frequency of the electric power that is supplied to the electric motor 22 by the VFD 34. The VFD 34 can include, for example, an electrical power converter including a line rectifier and line electrical current harmonic reducer, power circuits, and control circuits (such circuits including all communication and control logic, including electronic power switching circuits). The VFD 34 can respond, for example, to signals received from a microprocessor integrated within a control panel 36 to increase and/or decrease the speed of the electric motor 22 by changing the frequency of the current supplied to the electric motor 22. The speed of the electric motor 22 can be varied, for example, to meet changing system requirements.

According to an embodiment, operation of the first and second stage compressors 18, 20, and the HVACR system 10, can be controlled by, for example, the control panel 36 in connection with sensors located within the HVACR system 10 that allow for the reliable operation of the HVACR system 10. Other controls may be linked to the control panel 36, such as, but not limited to, compressor controls; system supervisory controls that can be coupled with other controls to improve efficiency; soft motor starter controls; controls for regulating guide vanes and/or controls to avoid system fluid surge; control circuitry for the electric motor 22 and/or VFD 34; and other sensors/controls are contemplated as should be understood. It should be apparent that software may be provided in connection with operation of the VFD 34 and other components of the HVACR system 10, for example.

It will be appreciated that the HVACR system 10 can include one or more additional components. For example, the HVACR system 10 can include a purge, one or more acid filters, or the like.

A composition of the environmentally-suitable chiller refrigerant employed by the HVACR system 10 can include a halogenated olefin composition. The environmentally-suitable chiller refrigerant may be a low pressure refrigerant. A low pressure refrigerant is a compound or mixture that has a vapor pressure less than, for example, about 14.7 pounds per square inch absolute (psia) at about 0° F. Because certain components, including the evaporator 14 and, under certain conditions, the condenser 12 of the HVACR system 10, may operate at lower than atmospheric pressure, it is possible for non-condensables such as air and moisture to leak into the chiller. These non-condensable elements make their way to and become trapped in the condenser 12 with the result that the condensing pressure and compressor power requirements increase thereby reducing chiller efficiency and cooling capacity.

In an embodiment, the refrigerant composition is a blend of R-1336mzz-(Z) and R-1130-(E). In an embodiment, the refrigerant composition is environmentally friendly, safe, and energy-efficient.

In an embodiment, a ratio of R-1336mzz-(Z) can be from at or about 69% by weight to at or about 81% by weight. In an embodiment, a ratio of R-1130-(E) can be from at or about 19% by weight to at or about 31% by weight. For example, in an embodiment, the refrigerant composition is a blend of R-1336mzz-(Z) and R-1130-(E) that is in a ratio of at or about 81% by weight R-1336mzz-(Z) to at or about 19% by weight R-1130-(E). In an embodiment, the refrigerant composition is a blend of R-1336mzz-(Z) and R-1130-(E) that is in a ratio of at or about 69% by weight R-1336mzz-(Z) to at or about 31% by weight R-1130-(E).

In an embodiment, a ratio of R-1336mzz-(Z) can be from at or about 74% by weight to at or about 81% by weight. In an embodiment, a ratio of R-1130-(E) can be from at or about 19% by weight to at or about 26% by weight. For example, in an embodiment, the refrigerant composition is a blend of R-1336mzz-(Z) and R-1130-(E) that is in a ratio of at or about 81% by weight R-1336mzz-(Z) to at or about 19% by weight R-1130-(E). In an embodiment, the refrigerant composition is a blend of R-1336mzz-(Z) and R-1130-(E) that is in a ratio of at or about 74% by weight R-1336mzz-(Z) to at or about 26% by weight R-1130-(E).

In an embodiment, the refrigerant composition is a blend of R-1336mzz-(Z) and R-1130-(E) that is in a ratio of at or about 75% by weight R-1336mzz-(Z) to at or about 25% by weight R-1130-(E). In an embodiment, the blend of R-1336-(Z) and R-1130-(E) that is in a ratio of at or about 75% by weight R-1336mzz-(Z) to at or about 25% by weight R-1130-(E) may form an azeotrope. In such an embodiment, the refrigerant composition may have a similar vapor pressure to R-123 and/or R-11. In an embodiment, limited or no hardware changes may be completed when retrofitting a chiller system operating with R-123 or R-11 refrigerants.

In an embodiment, the refrigerant composition is a blend of R-1336mzz-(Z) and R-1130-(E) that is a ratio of at or about 69.7% by weight R-1336mzz-(Z) to at or about 25.3% by weight R-1130-(E). In such an embodiment, the refrigerant composition may be referred to as R-514A. It will be appreciated that the ranges of the refrigerant composition are with respect to the constituent refrigerants in the refrigerant mixture. The refrigerant composition can be further combined with, for example, a lubricant, additives, conditioners, or the like.

In an embodiment, a suitable range for the ratio of components of the mixture can be determined based on, for example, temperature glide and/or deviation from a nominal composition. In an embodiment, a suitable range for the ratio of components of the mixture can be determined based on, for example, temperature glide leading to fractionation of the blend between liquid and vapor phases and to degradation in capacity, efficiency, or a combination of capacity and efficiency. In an embodiment, the suitable range for the ratio of components of the mixture can bet determined by the flammability boundary or the capability of the blending operation to accurately measure the weights, volumes, or weights and volumes of the constituents. In an embodiment, the temperature glide can be controlled to not exceed 1° F. In such an embodiment, capacity may be controlled within 5%. In an embodiment, efficiency can be controlled within 2%.

In an embodiment, replacing the existing refrigerant with the refrigerant composition described herein may lead to adjusting an impeller diameter or speed change through either gear changes or addition of or adjustment to a variable frequency drive and/or electric motor sizing; adjusting for a modified evaporator or condenser tube having more optimal tube enhancements; switching to a compatible lubricant include, but not limited to, polyester, polyolester, polyvinylether, alkyl benzene, or the like; replacing sealing materials (e.g., elastomers, liquid adhesives, etc.); adjusting orifice sizing to optimize refrigerant flow rate and sealing between the evaporator and the condenser; adjusting a size of the economizer to allow for changes in refrigerant charge storage and operation; replacing or altering the purge to operate with the refrigerant composition; and/or adjusting, altering, or replacing controls to operate with the new refrigerant. In an embodiment, the impeller diameter may be increased or the speed increased. In an embodiment the orifice sizing may be reduced. In an embodiment, the economizer size may be increased.

In an embodiment, a method of charging a chiller system is disclosed. The method includes removing an existing refrigerant from the chiller system. The existing chiller refrigerant includes a relatively high global warming potential (GWP) or ozone depleting refrigerant and a lubricant. The method includes replacing all, or some part of, the high GWP refrigerant with a halogenated olefin composition. In an embodiment, the halogenated olefin composition includes a blend of R-1336mzz-(Z) and R-1130-(E). A substantial portion of the chiller components (e.g., the system hardware) are retained and/or unchanged in the chiller system. In an embodiment, the existing chiller refrigerant includes R-123, R-11, or the like.

Figure 2:
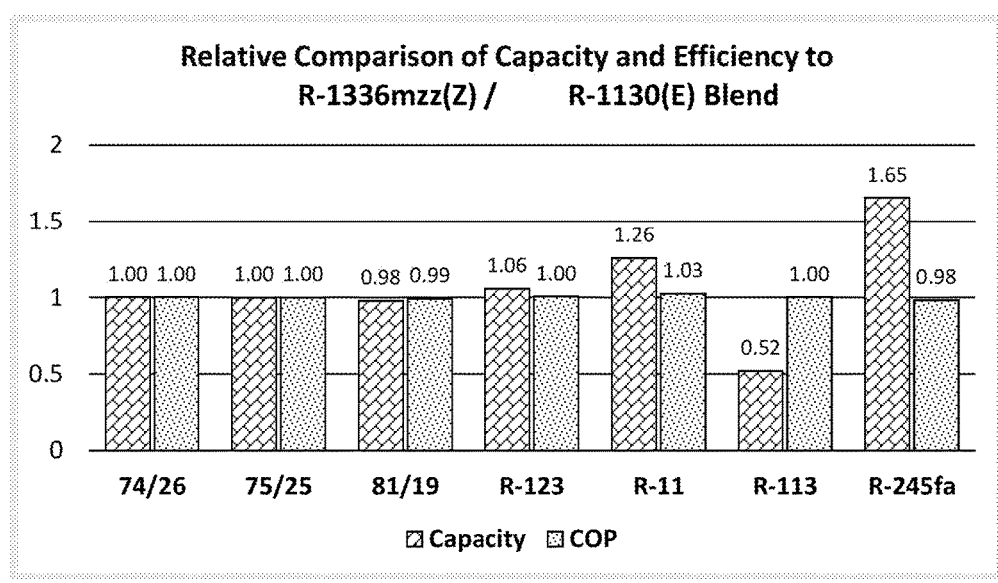
FIG. 2 is a chart showing a relative comparison of capacity and efficiency for the refrigerant composition described in this specification, according to an embodiment.

FIG. 2 is a chart 100 showing a relative comparison of capacity and efficiency for the refrigerant compositions described in this specification, according to an embodiment. The illustrated embodiment shows a comparison of capacity and coefficient of performance for the range of refrigerant composition described herein as well as for existing refrigerant compositions R-123 and R-11. As illustrated in the chart, when the refrigerant composition described herein has a capacity of 1.00 and coefficient of performance of 1.00, the capacities and coefficients of performance of the existing refrigerants varies in a similar range. FIG. 2 shows that the refrigerant composition described herein offers a replacement with similar features as the existing refrigerants.

Aspects:

Any one of aspects 1-4 can be combined with any one of aspects 5-11 or 12-23. Any one of aspects 5-11 can be combined with any one of aspects 12-23.

Aspect 1. A refrigerant composition, comprising:
a mixture including R-1336mzz-(Z) and R-1130-(E),
wherein an amount of R-1336mzz-(Z) in the mixture is in a range from at or about 69% by weight to at or about 81% by weight, and an amount of R-1130-(E) in the mixture is in a range from at or about 31% by weight to at or about 19% by weight, and
wherein the refrigerant composition has a 100 year direct global warming potential (GWP) of less than 150.

Aspect 2. The refrigerant composition according to aspect 1, wherein the amount or R-1336mzz-(Z) in the mixture is in a range from at or about 69% by weight to at or about 76% by weight and the amount of R-1130-(E) in the mixture is in a range from at or about 31% by weight to at or about 24% by weight.

Aspect 3. The refrigerant composition according to aspect 1, wherein the amount of R-1336mzz-(Z) in the mixture is at or about 75% by weight and the amount of R-1130-(E) in the mixture is at or about 25% by weight.

Aspect 4. The refrigerant composition according to any one of aspects 1-3, wherein the refrigerant composition is a low-pressure refrigerant for a low-pressure chiller system.

Aspect 5. A refrigeration system, comprising:
a compressor, a condenser, an expansion device, and an evaporator fluidly connected to form a refrigeration circuit; and a refrigerant composition including an environmentally-suitable chiller refrigerant that has a 100 year direct global warming potential (GWP) of less than 150, the refrigerant composition including a mixture including R-1336mzz-(Z) and R-1130-(E), wherein an amount of R-1336mzz-(Z) in the mixture is in a range from at or about 69% by weight to at or about 81% by weight, and an amount of R-1130-(E) in the mixture is in a range from at or about 31% by weight to at or about 19% by weight.

Aspect 6. The refrigeration system according to aspect 5, wherein the amount or R-1336mzz-(Z) in the mixture is in a range from at or about 69% by weight to at or about 76% by weight and the amount of R-1130-(E) in the mixture is in a range from at or about 31% by weight to at or about 24% by weight.

Aspect 7. The refrigeration system according to aspect 5, wherein the amount of R-1336mzz-(Z) in the mixture is at or about 75% by weight and the amount of R-1130-(E) in the mixture is at or about 25% by weight.

Aspect 8. The refrigeration system according to any one of aspects 5-7, wherein the refrigerant composition is a low-pressure refrigerant for a low-pressure chiller system.

Aspect 9. The refrigeration system according to any one of aspects 5-8, further comprising a purge.

Aspect 10. The refrigeration system according to any one of aspects 5-9, wherein the environmentally-suitable chiller refrigerant has a GWP less than 10.

Aspect 11. The refrigeration system according to any one or aspects 5-10, wherein the environmentally-suitable chiller refrigerant has a GWP of at or about 2.

Aspect 12. A method of charging a chiller system, comprising:
removing an existing refrigerant from the chiller system;
replacing the existing refrigerant with an environmentally friendly refrigerant composition that includes a mixture of R-1336mzz-(Z) and R-1130-(E).

Aspect 13. The method according to aspect 12, wherein the existing chiller refrigerant has a 100 year direct global warming potential (GWP) of at least 150 or ozone depleting refrigerant and a lubricant.

Aspect 14. The method according to aspect 12, wherein the existing chiller refrigerant includes at least one of R-123, and R-11.

Aspect 15. The method according to any one of aspects 12-14, further comprising retaining existing chiller hardware when replacing the existing refrigerant.

Aspect 16. The method according to any one of aspects 12-15, wherein the environmentally friendly chiller refrigerant has a GWP of less than 150.

Aspect 17. The method according to aspect 16, wherein an amount of R-1336mzz-(Z) in the mixture is in a range from at or about 69% by weight to at or about 81% by weight, and an amount of R-1130-(E) in the mixture is in a range from at or about 31% by weight to at or about 19% by weight.

Aspect 18. The method according to aspect 16, wherein an amount or R-1336mzz-(Z) in the mixture is in a range from at or about 69% by weight to at or about 76% by weight and an amount of R-1130-(E) in the mixture is in a range from at or about 31% by weight to at or about 24% by weight.

Aspect 19. The method according to aspect 16, wherein an amount of R-1336mzz-(Z) in the mixture is at or about 75% by weight and an amount of R-1130-(E) in the mixture is at or about 25% by weight.

Aspect 20. The method according to any one of aspects 12-19, wherein the refrigerant composition is a low-pressure refrigerant and the chiller system is a low-pressure chiller system.

Aspect 21. The method according to any one of aspects 12-20, wherein the environmentally friendly refrigerant composition has a GWP less than 10.

Aspect 22. The method according to any one or aspects 12-21, wherein the environmentally friendly refrigerant composition has a GWP of at or about 2.

Aspect 23. The method according to any one or aspects 12-21, further comprising one or more of:
adjusting an impeller diameter or speed change through either gear changes or addition of or adjustment to a variable frequency drive and/or electric motor sizing; adjusting for a modified evaporator or condenser tube having more optimal tube enhancements; switching to a compatible lubricant including one of a polyester, polyolester, polyvinylether, and alkyl benzene; replacing sealing materials; adjusting orifice sizing to optimize refrigerant flow rate and sealing between an evaporator and a condenser; adjusting a size of an economizer to allow for changes in refrigerant charge storage and operation; replacing or altering a purge to operate with the environmentally friendly refrigerant composition; and adjusting, altering, or replacing controls to operate with the environmentally friendly refrigerant composition.

The terminology used in this specification is intended to describe particular embodiments and is not intended to be limiting. The terms "a," "an," and "the" include plural forms as well, unless clearly indicated otherwise. The terms "comprises" and/or "comprising," when used, indicated the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" may, but does not necessarily, refer to the same embodiment. The embodiments and disclosure are examples only. Other and further embodiments may be devised without departing from the basic scope thereof, with the true scope and spirit of the disclosure being indicated by the claims that follow.

What is claimed is:

1. A refrigeration system, comprising:
a negative pressure liquid chiller, including a compressor, a condenser, an expansion device, and an evaporator fluidly connected to form a refrigeration circuit, and further including a purge; and
a refrigerant composition configured as a low pressure refrigerant and including an environmentally-suitable chiller refrigerant that has a 100 year direct global warming potential (GWP) of less than 150, the refrigerant composition including a mixture including R-1336mzz-(Z) and R-1130-(E), wherein an amount of R-1336mzz-(Z) in the mixture is in a range from at or about 69% to at or about 81%, and an amount of R-1130-(E) in the mixture is in a range from at or about 31% to at or about 19%.

2. The refrigeration system according to claim 1, wherein the amount of R-1336mzz-(Z) in the mixture is in a range from at or about 69% to at or about 76% and the amount of R-1130-(E) in the mixture is in a range from at or about 31% to at or about 24%.

3. The refrigeration system according to claim 1, wherein the amount of R-1336mzz-(Z) in the mixture is at or about 75% and the amount of R-1130-(E) in the mixture is at or about 25%.

4. The refrigeration system according to claim 1, wherein the environmentally-suitable chiller refrigerant has a GWP less than 10.

5. The refrigeration system according to claim 1, wherein the environmentally-suitable chiller refrigerant has a GWP of at or about 2.

6. A method of charging a chiller system, comprising:
removing an existing refrigerant from the chiller system, wherein the chiller system is a negative pressure liquid chiller including a purge;
replacing the existing refrigerant with an environmentally friendly refrigerant composition that includes a mixture of R-1336mzz-(Z) and R-1130-(E) the environmentally friendly refrigerant composition configured as a low pressure refrigerant.

7. The method according to claim 6, wherein the existing chiller refrigerant has a 100 year direct global warming potential (GWP) of at least 150 or ozone depleting refrigerant and a lubricant.

8. The method according to claim 6, wherein the existing chiller refrigerant includes at least one of R-123 and R-11.

9. The method according to claim 6, further comprising retaining existing chiller hardware when replacing the existing refrigerant.

10. The method according to claim 6, wherein the environmentally friendly chiller refrigerant has a GWP of less than 150.

11. The method according to claim 10, wherein an amount of R-1336mzz-(Z) in the mixture is in a range from at or about 69% by weight to at or about 81% by weight, and an amount of R-1130-(E) in the mixture is in a range from at or about 31% by weight to at or about 19% by weight.

12. The method according to claim 10, wherein an amount of R-1336mzz-(Z) in the mixture is in a range from at or about 69% by weight to at or about 76% by weight and an amount of R-1130-(E) in the mixture is in a range from at or about 31% by weight to at or about 24% by weight.

13. The method according to claim 10, wherein an amount of R-1336mzz-(Z) in the mixture is at or about 75% by weight and an amount of R-1130-(E) in the mixture is at or about 25% by weight.

14. The method according to claim 6, wherein the environmentally friendly refrigerant composition has a GWP less than 10.

15. The method according to claim 6, wherein the environmentally friendly refrigerant composition has a GWP of at or about 2.

16. The refrigeration system according to claim 1, wherein the low pressure refrigerant has a vapor pressure less than about 14.7 pounds per square inch absolute (psia) at about 0° F.

17. The method according to claim 6, wherein the low pressure refrigerant has a vapor pressure less than about 14.7 pounds per square inch absolute (psia) at about 0° F.

* * * * *